(12) United States Patent
Tsai et al.

(10) Patent No.: US 7,768,724 B2
(45) Date of Patent: Aug. 3, 2010

(54) METHOD FOR MAKING A CAMERA MODULE AND CAMERA MODULE MADE THEREBY

(75) Inventors: Chia-Hsi Tsai, Taipei (TW); Tzu-Kan Chen, Taipei (TW); Meng-Hsin Kuo, Taipei (TW); Cheng-Te Tseng, Taipei (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 12/153,090

(22) Filed: May 14, 2008

(65) Prior Publication Data

US 2009/0059398 A1 Mar. 5, 2009

(30) Foreign Application Priority Data

Aug. 27, 2007 (TW) ............... 96131662 A

(51) Int. Cl.
*G02F 1/29* (2006.01)
*G02F 1/33* (2006.01)
*G02F 1/35* (2006.01)

(52) U.S. Cl. .......... 359/819; 359/811; 359/830
(58) Field of Classification Search ......... 359/811, 359/819, 830
See application file for complete search history.

(56) References Cited

U.S. PATENT DOCUMENTS

| 6,710,945 B1 * | 3/2004 | Miranda ............ 359/819 |
| 2003/0052702 A1 * | 3/2003 | Auburger et al. ....... 324/753 |
| 2008/0100933 A1 * | 5/2008 | Yuan ............... 359/820 |
| 2008/0170305 A1 * | 7/2008 | Tsai ............... 359/819 |

* cited by examiner

*Primary Examiner*—Jessica T Stultz
*Assistant Examiner*—Mahidere S Sahle
(74) *Attorney, Agent, or Firm*—Rosenberg, Klein & Lee

(57) ABSTRACT

A method for making a camera module includes the steps of: (a) providing a mold with a mold cavity; (b) mounting at least a sensing element and a lens within the mold cavity in such a manner that the sensing element and the lens are spaced apart from each other; and (c) forming a camera barrel by injecting a molding material into the mold cavity and by molding the molding material over the sensing element and the lens.

15 Claims, 24 Drawing Sheets

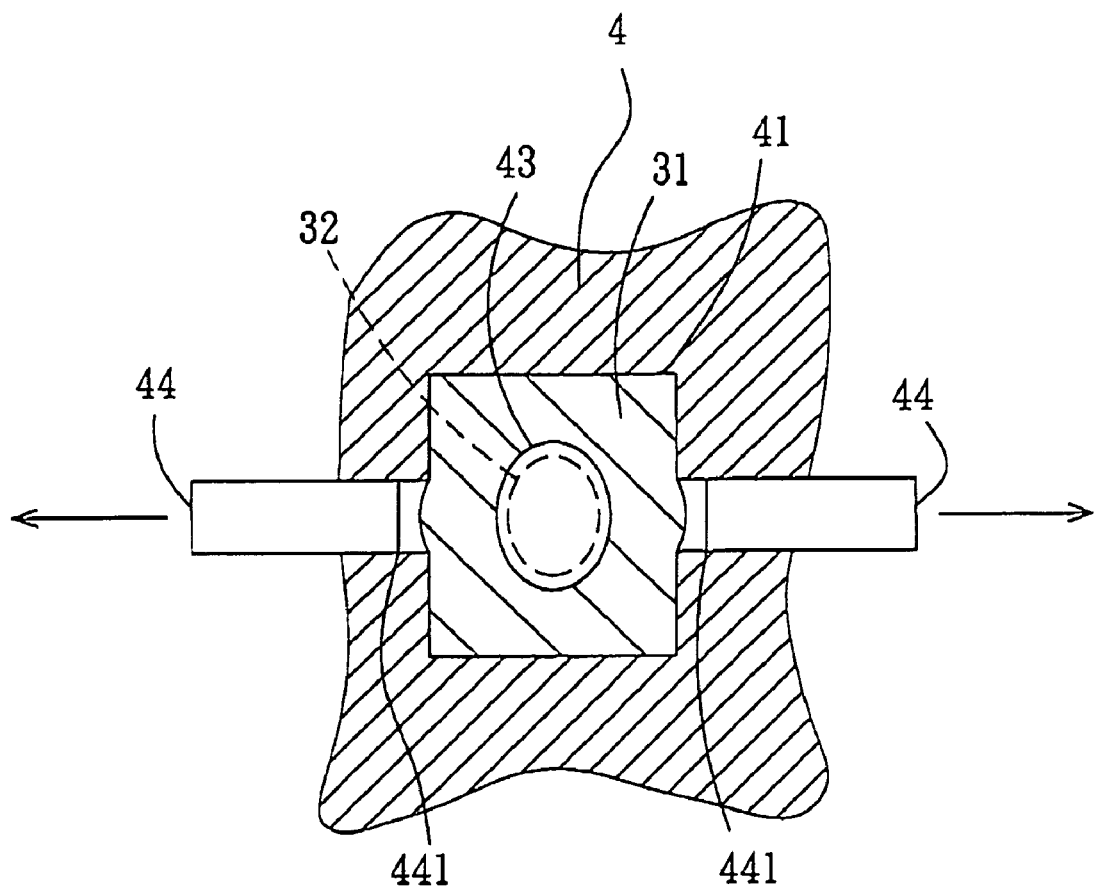
F I G. 8

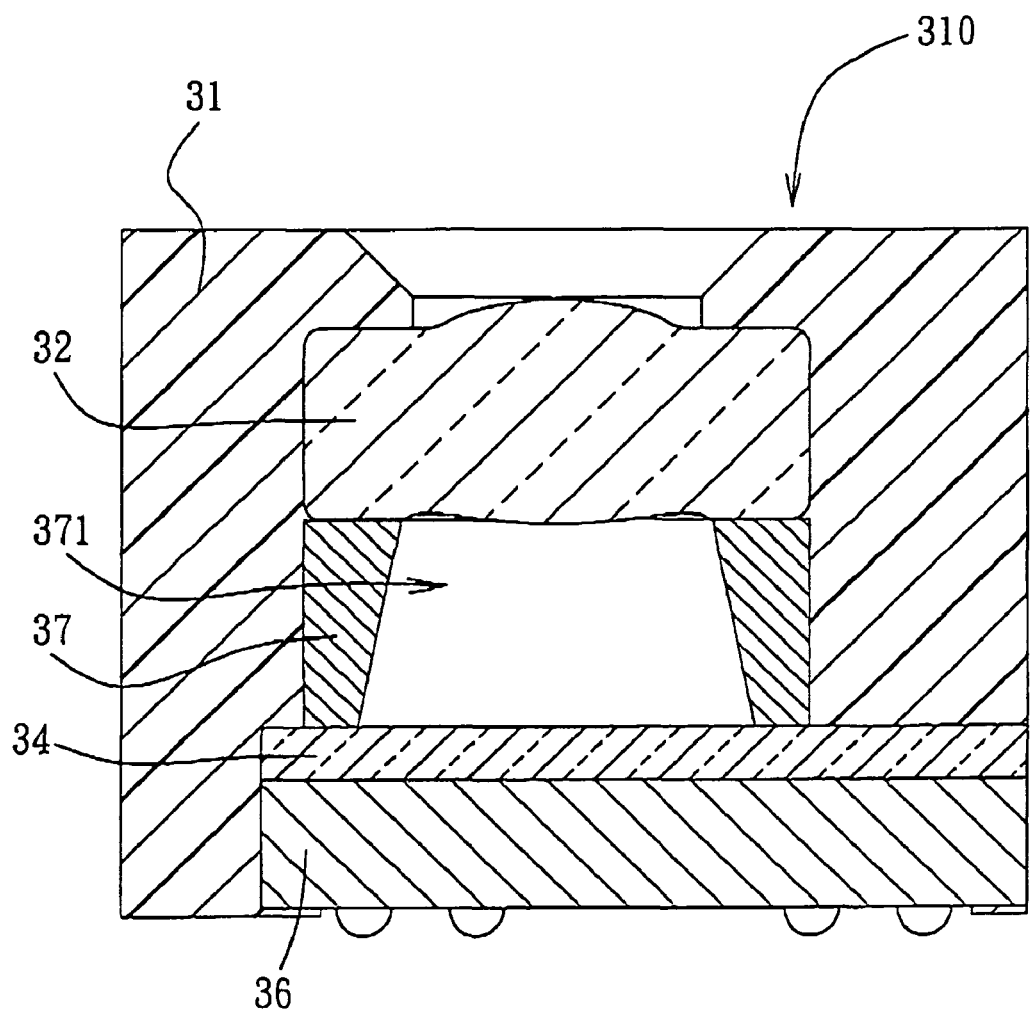
F I G. 9

US 7,768,724 B2

METHOD FOR MAKING A CAMERA MODULE AND CAMERA MODULE MADE THEREBY

CROSS-REFERENCE TO RELATED APPLICATION

This application claims priority of Taiwanese Application No. 096131662, filed on Aug. 27, 2007.

BACKGROUND OF THE INVENTION

1. Field of the Invention

The invention relates to a method for making a camera module, more particularly to a method for making a camera module in which a barrel is molded over a sensing element and a lens by insert molding. The invention also relates to a lens camera module made thereby.

2. Description of the Related Art

Referring to FIG. 1, a conventional camera module 1 includes: a first barrel portion 11 having an outer threaded surface 111, a central hole 112, and a receiving space 113; a second barrel portion 12 having an inner threaded surface 121 and threadedly engaged to the first barrel portion 11; and a first lens 13, a first spacer 14, a second lens 15, and a second spacer 16 received in the receiving space 113. The second barrel portion 12 is mounted on a circuit board 2. The camera module 1 further includes a filter 17 received within the second barrel portion 12, and a sensing element 18 received with the second barrel portion 12 and mounted on the circuit board 2. Light enters into the first barrel portion 11 through the central hole 112, and is transmitted to the sensing element 18 through the first lens 13, the second lens 15, and the filter 17.

Since the first lens 13, the first spacer 14, the second lens 15, the second spacer 16, and the filter 17 are respectively assembled to the first and second barrel portions 11, 12, they can not be assembled precisely and an assembly tolerance may occur. After assembly, the first barrel portion 11 and the second barrel portion 12 should be rotated relatively to adjust a focal distance between the first lens 13 and the second lens 15. However, grains may be produced due to the friction between the outer threaded surface 111 of the first barrel portion 11 and the inner threaded surface 121 of the second barrel portion 12 during the rotation of the first barrel portion 11 relative to the second barrel portion 12. The grains fall onto the filter 17, which in turn reduces the quantity of the light reaching the sensing element 18 and reduces the imaging quality of the camera module 1.

SUMMARY OF THE INVENTION

An object of the present invention is to provide a method for making a camera module, which can overcome the aforesaid shortcomings. Another object of the present invention is to provide a camera module made by the method.

In the first aspect of this invention, a method for making a camera-module includes the steps of:
(a) providing a mold with a mold cavity;
(b) mounting at least a sensing element and a lens within the mold cavity in such a manner that the sensing element and the lens are spaced apart from each other; and
(c) forming a barrel by injecting a molding material into the mold cavity and by molding the molding material over the sensing element and the lens.

In the second aspect of this invention, a camera module includes: a lens; a sensing element spaced apart from the lens; and a barrel molded over the lens and the sensing element by insert molding.

In the third aspect of this invention, an electronic device includes a main body and a camera module. The main body is formed with a receiving space and an opening communicated with the receiving space. The camera module is received in the receiving space, and includes a lens aligned with the opening, a sensing element spaced apart from the lens, and a barrel molded over the sensing element and the lens by insert molding.

BRIEF DESCRIPTION OF THE DRAWINGS

Other features and advantages of the present invention will become apparent in the following detailed description of the preferred embodiments with reference to the accompanying drawings, of which:

FIGS. 5 to 8 are sectional views illustrating steps of the method for making the first preferred embodiment;

FIG. 9 is a sectional view of a second preferred embodiment of a camera module according to this invention;

DETAILED DESCRIPTION OF THE PREFERRED EMBODIMENTS

Figure 1:
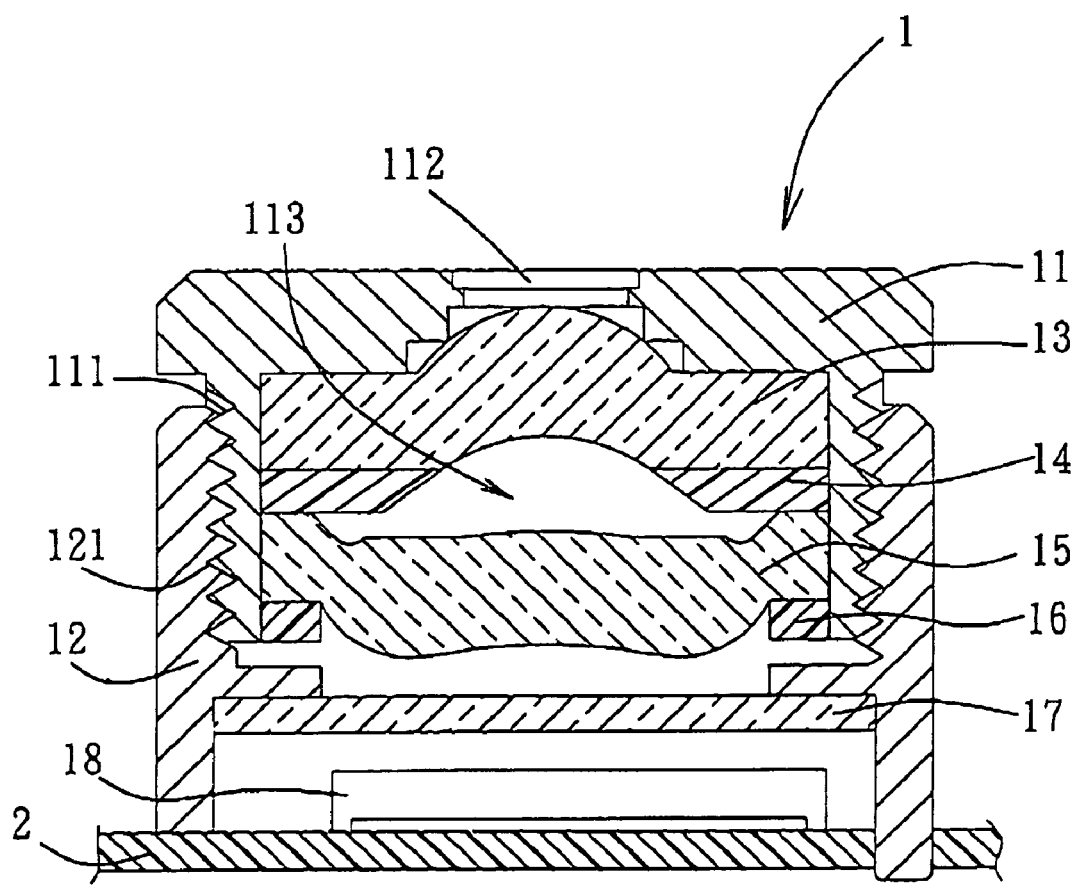
FIG. 1 is a sectional view of a conventional camera module.

Before the present invention is described in greater detail, it should be noted that like elements are denoted by the same reference numerals throughout the disclosure.

Figure 2:
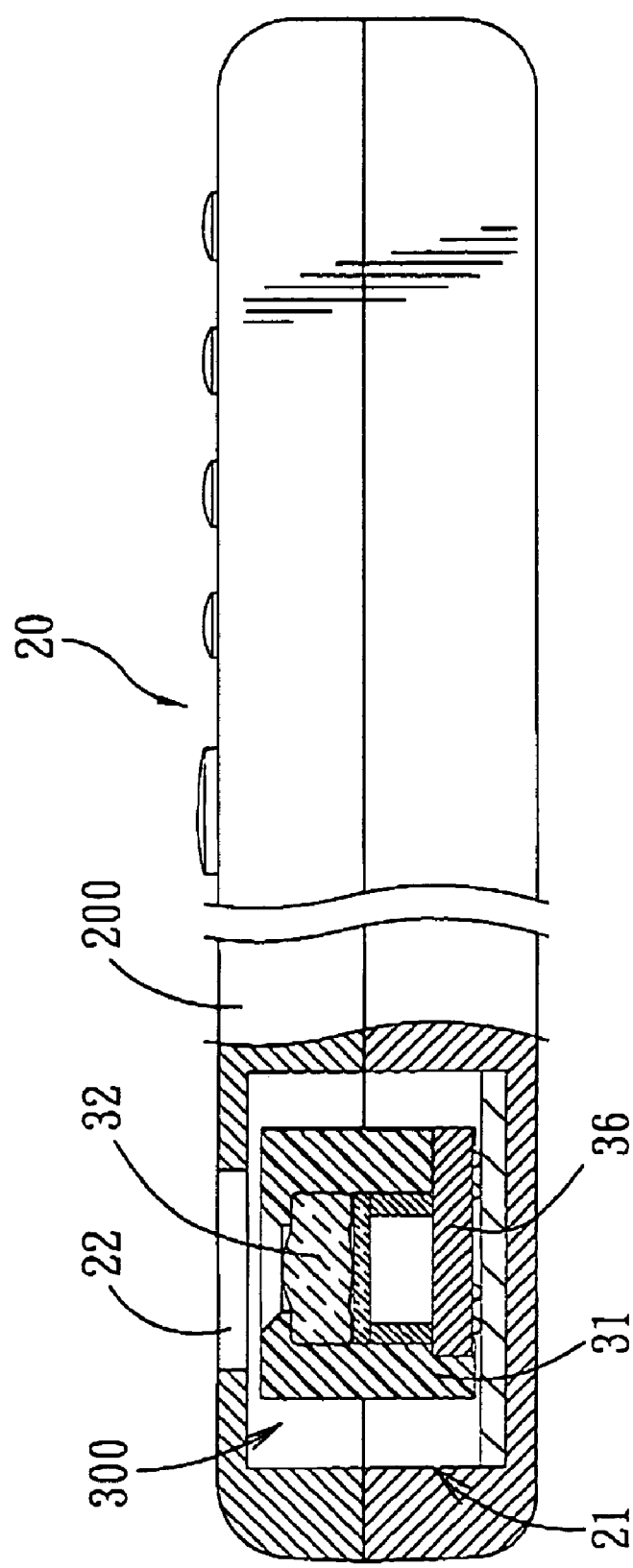
FIG. 2 is a fragmentary partly sectional view of an electronic device including a first preferred embodiment of a camera module according to this invention.
Figure 3:
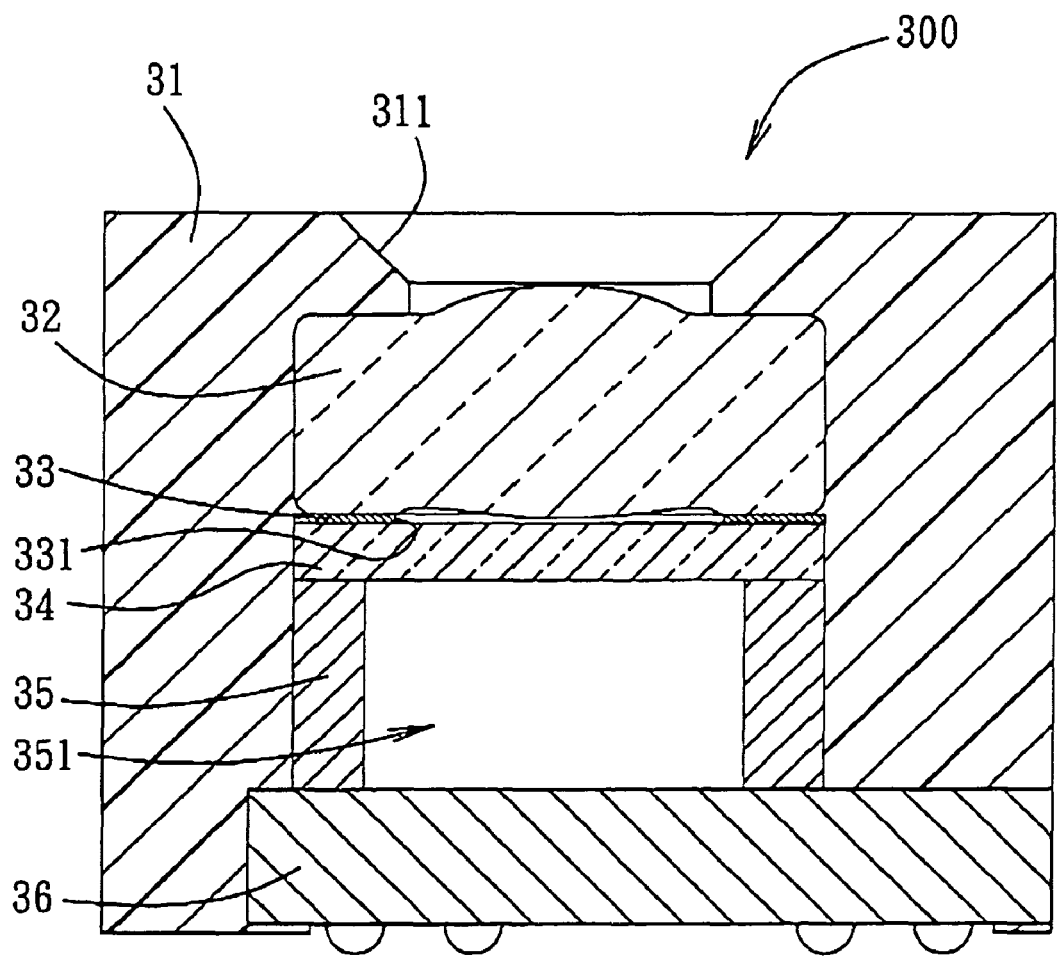
FIG. 3 is a sectional view of the first preferred embodiment.
Figure 4:
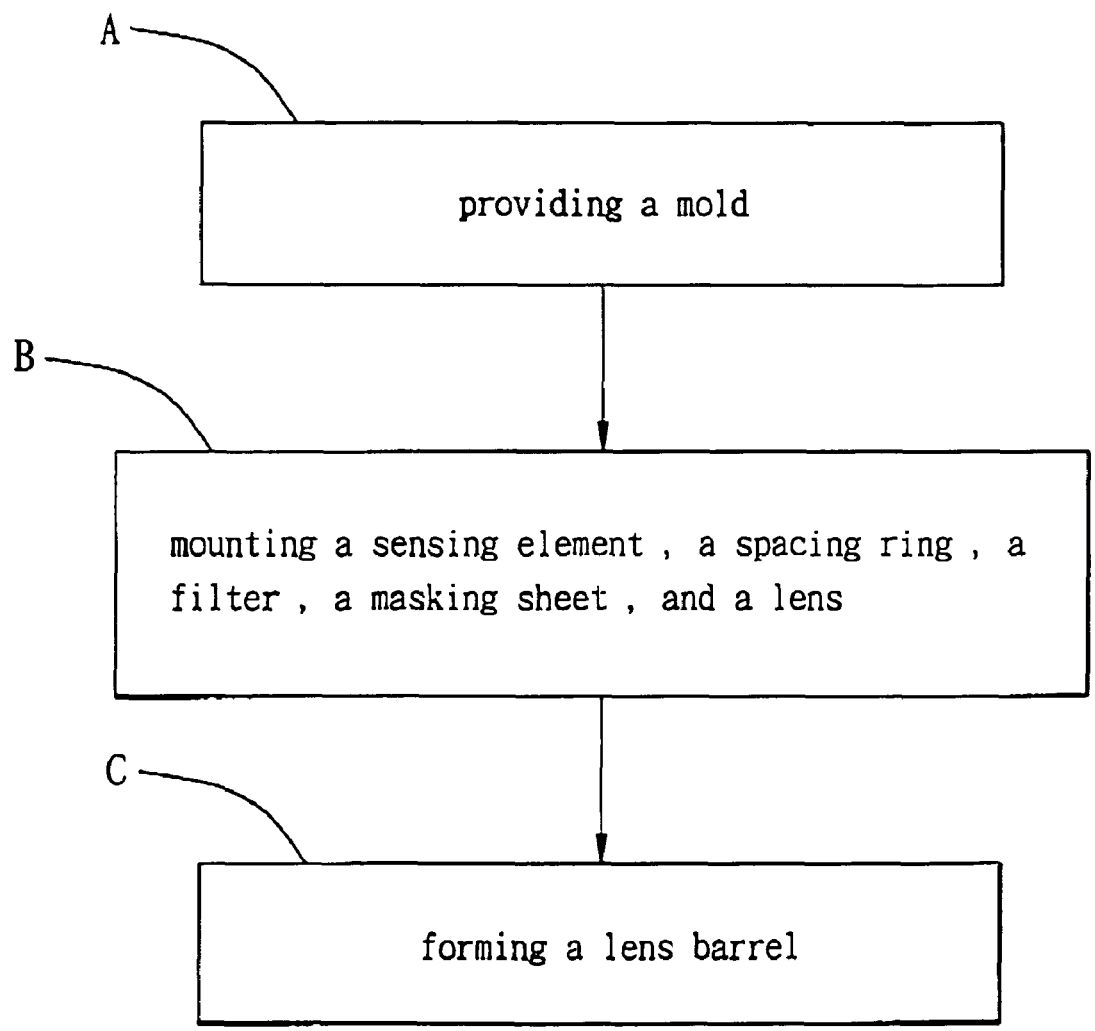
FIG. 4 is a flow chart of a method for making the first preferred embodiment.
Figure 5:
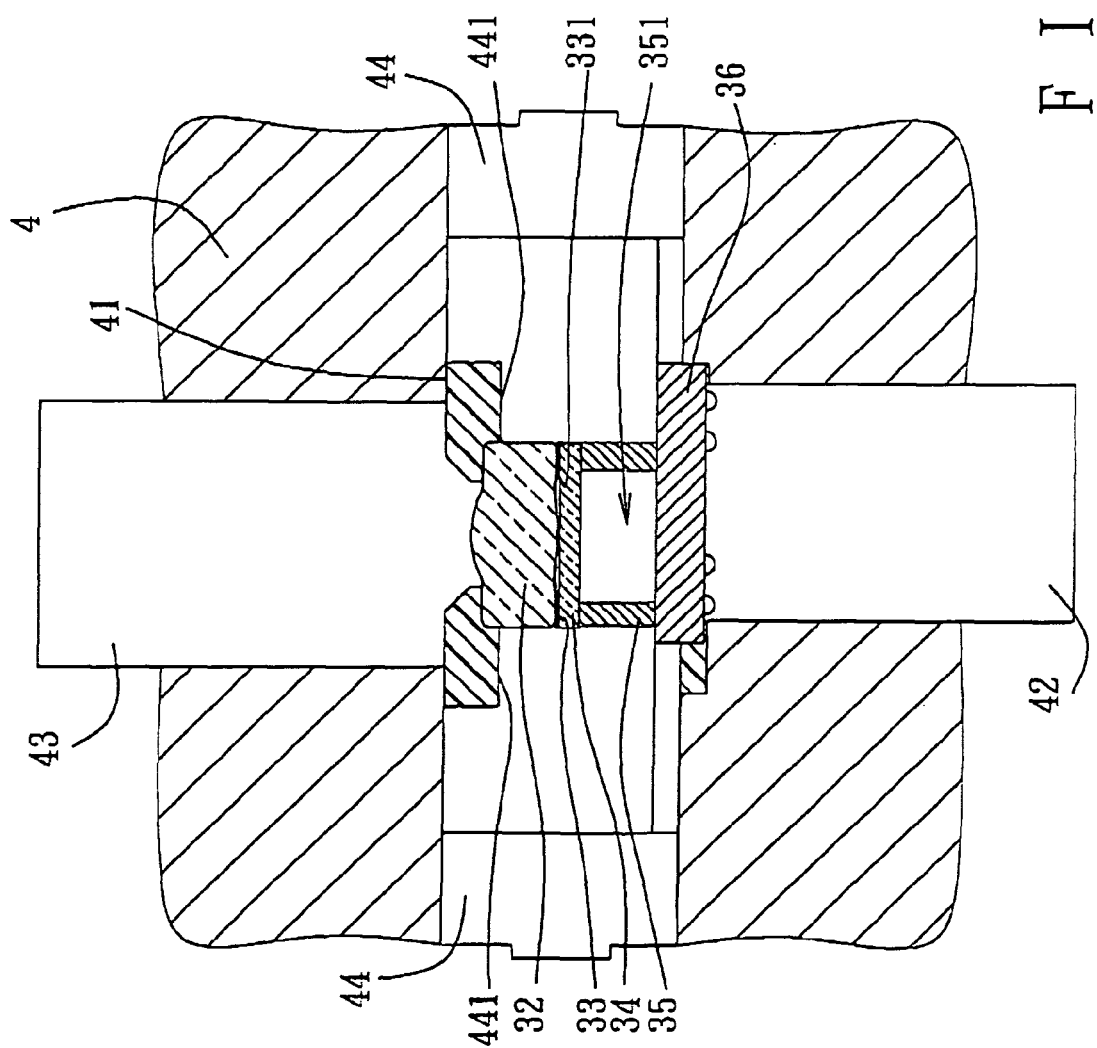
Figure 6:
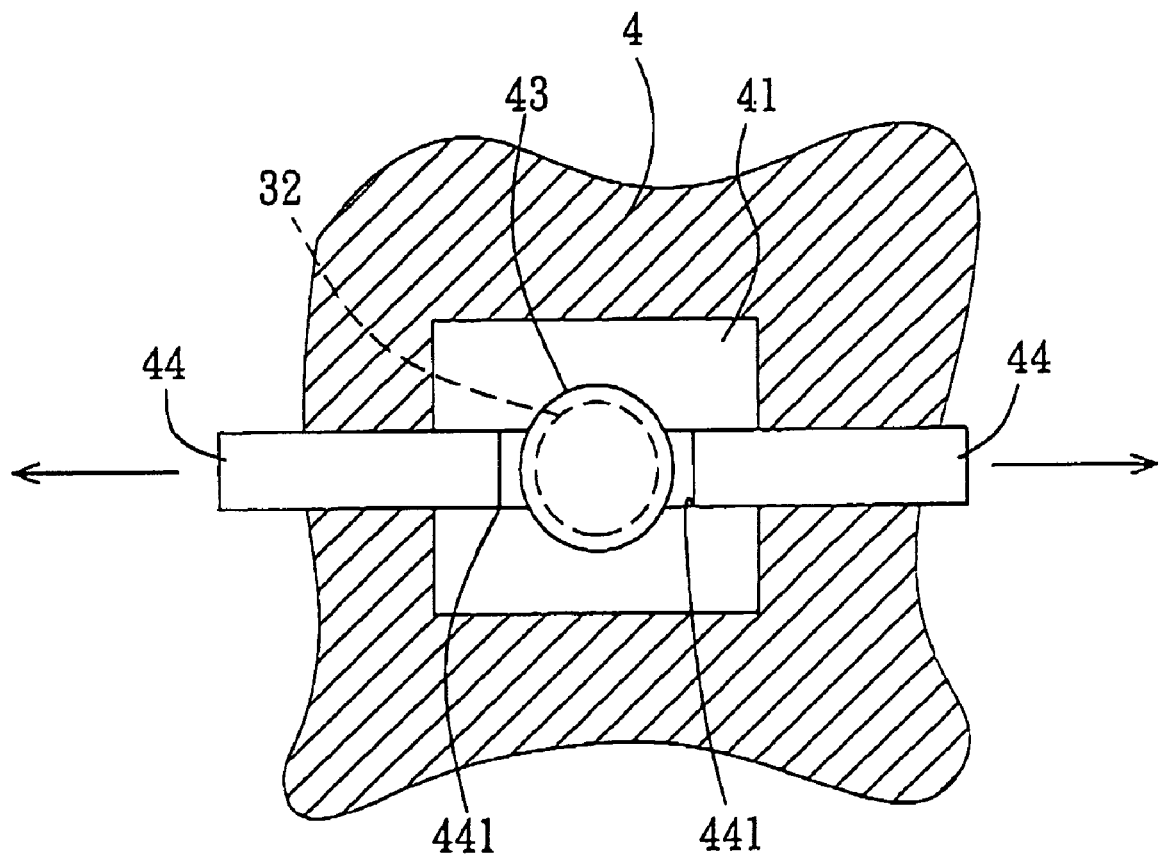

Referring to FIGS. 2 and 3, the first preferred embodiment of a camera module 300 according to this invention is installed in an electronic device 20, which is illustrated as a cellular phone. The camera module 300 can be installed in a personal digital assistant (PDA) or other portable electronic devices. The electronic device 20 includes a main body 200 and the camera module 300. The main body 200 is formed with a receiving space 21 and an opening 22 communicated with the receiving space 21. The camera module 300 is received in the receiving space 21, and includes a lens 32 aligned with the opening 22, a sensing element 36 spaced apart from the lens 32, a filter 34 mounted between the sensing element 36 and the lens 32, a masking sheet 33 mounted between the lens 32 and the filter 34 and having a central hole 331, a spacing ring 35 mounted between the filter 34 and the sensing element 36, and a barrel 31 molded over the sensing element 36, the spacing ring 35, the filter 34, the masking sheet 33, and the lens 32 by insert molding.

The barrel 31 is cylindrical or rectangular, and is made of a molding material, such as a plastic material. The barrel 31 has a top hole 311 aligned with the opening 22 of the main body 200 and the central hole 331 of the masking sheet 33. The filter 34 used in the preferred embodiment is an infrared (IR) filter. The spacing ring 35 has a certain thickness, and confines a through hole 351 aligned with the opening 22 of the main body 200 and the central hole 331 of the masking sheet 33. The thickness of the spacing ring 35 is adjusted according to requirements, i.e., the desired focal distance between the lens 32 and the sensing element 36. Furthermore, more than one lens 32 can be used in the camera module 300 of the present invention, if desired.

Referring to FIGS. 4 to 8, a method for making the first preferred embodiment of the camera module 300 includes the steps of:

(A) providing a mold 4;

The mold 4 has a mold cavity 41, and includes an upper positioner 43, a lower positioner 42, and two opposite side positioners 44, which are movable in directions transverse to moving directions of the upper and lower positioners 43, 42. Each of the side positioners 44 has an inner abutment surface 442 with an indentation 441.

(B) mounting the sensing element 36, the spacing ring 35, the filter 34, the masking sheet 33, and the lens 32:

The sensing element 36, the spacing ring 35, the filter 34, the masking sheet 33, and the lens 32 are positioned and centered sequentially or simultaneously within the mold cavity 41 so that the sensing element 36 and the lens 32 are spaced apart from each other. The upper and lower positioners 43, 42 are moved within the mold 4 to abut against the lens 32 and the sensing element 36, respectively, and the two opposite side positioners 44 are moved within the mold 4 to abut against the sensing element 36, the spacing ring 35, the filter 34, the masking sheet 33, and the lens 32.

(C) forming the barrel 31:

A molding material is injected into the mold cavity 41 and is molded over the Sensing element 36, the spacing ring 35, the filter 34, the masking sheet 33, and the lens 32 by insert molding. Specifically, the molding material flows between the lens 32 and the side positioners 44 at the beginning of the injecting of the molding material and before flowing between the sensing element 36 and the side positioners 44. Therefore, the molding material is allowed to flow into the indentation 441 of each of the side positioners 44 at the beginning of the injecting of the molding material (best shown in FIG. 5). When the molding material hardens in the indentation 441, the lens 32 is properly positioned against the upper positioner 43.

Figure 7:
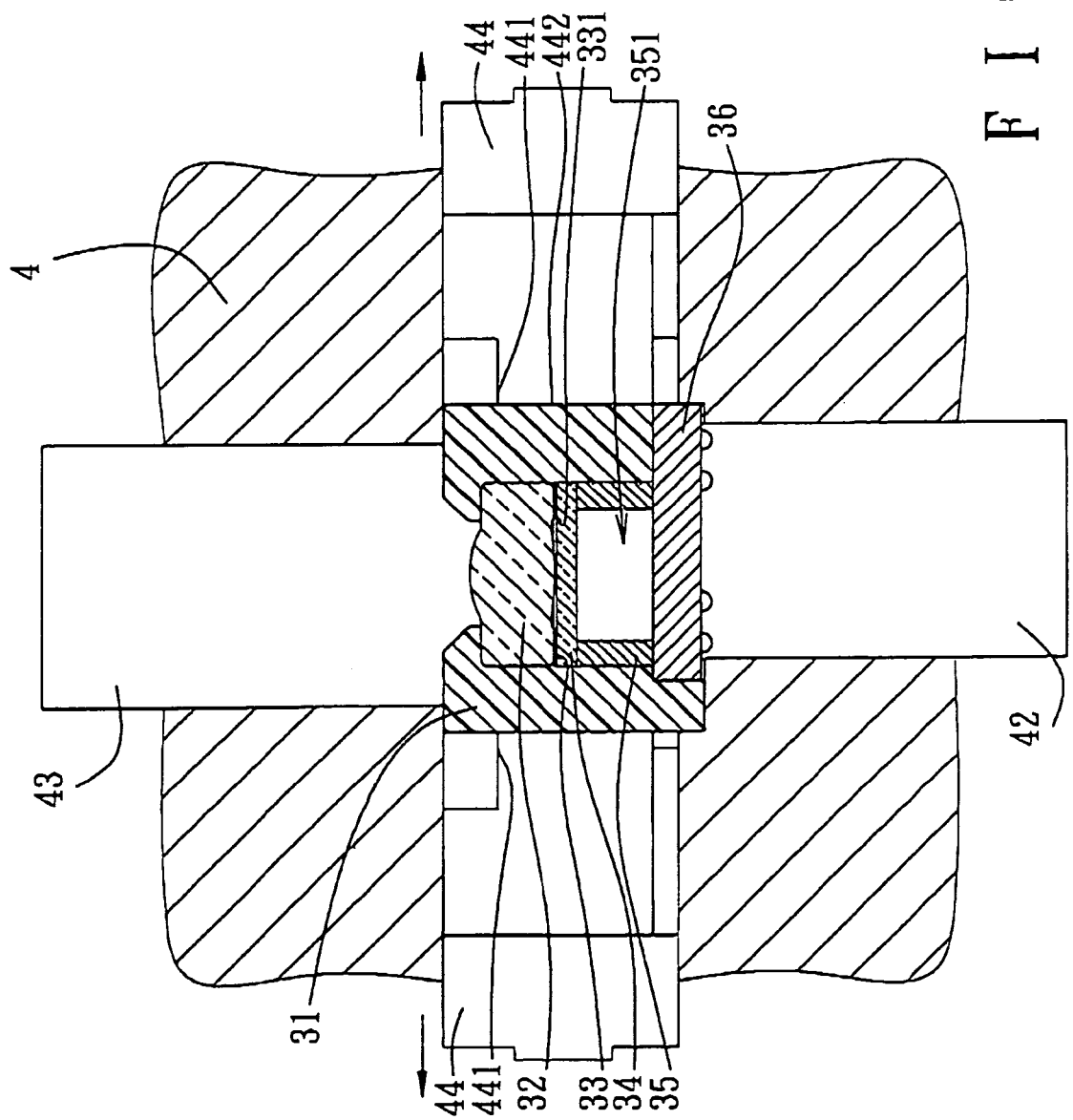

Thereafter, specifically referring to FIGS. 7 and 8, the side positioners 44 are moved gradually away from the sensing element 36, the spacing ring 35, the filter 34, the masking sheet 33, and the lens 32 during the injecting of the molding material so as to permit the molding material to flow between each of the side positioners 44 and each of the sensing element 36, the spacing ring 35, the filter 34, the masking sheet 33, and the lens 32. The barrel 31 is formed over the sensing element 36, the spacing ring 35, the filter 34, the masking sheet 33, and the lens 32 when the molding material is hardened.

Since the sensing element 36, the spacing ring 35, the filter 34, the masking sheet 33, and the lens 32 are positioned and centered within the mold cavity 41 by the upper and lower positioners 43, 42 during the insert molding, the occurrence of assembly tolerance and the adjustment of the focal distance can be avoided. Therefore, the aforesaid shortcomings encountered in the prior art can be overcome.

Figure 10:
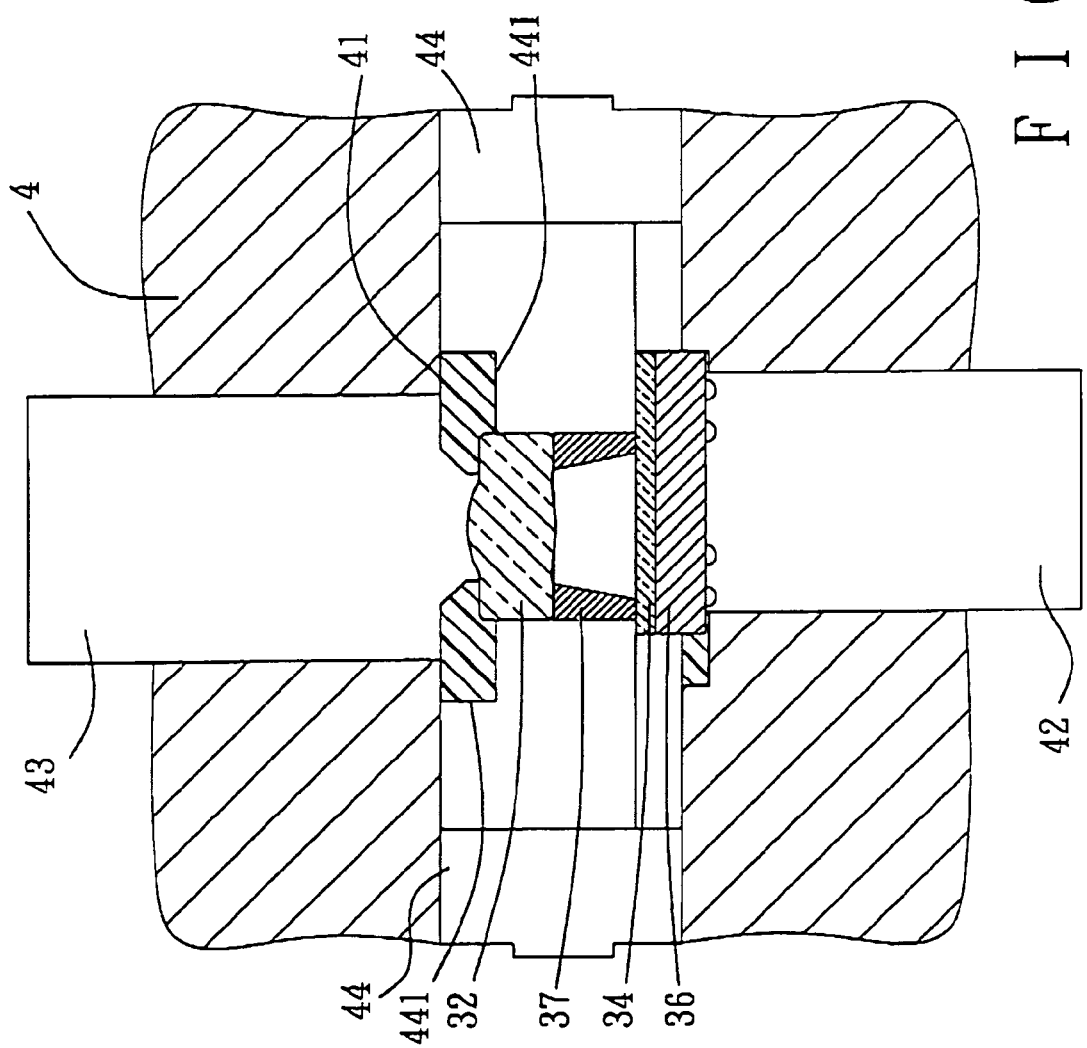
FIGS. 10 and 11 are sectional views illustrating steps of a method for making the second preferred embodiment.
Figure 11:
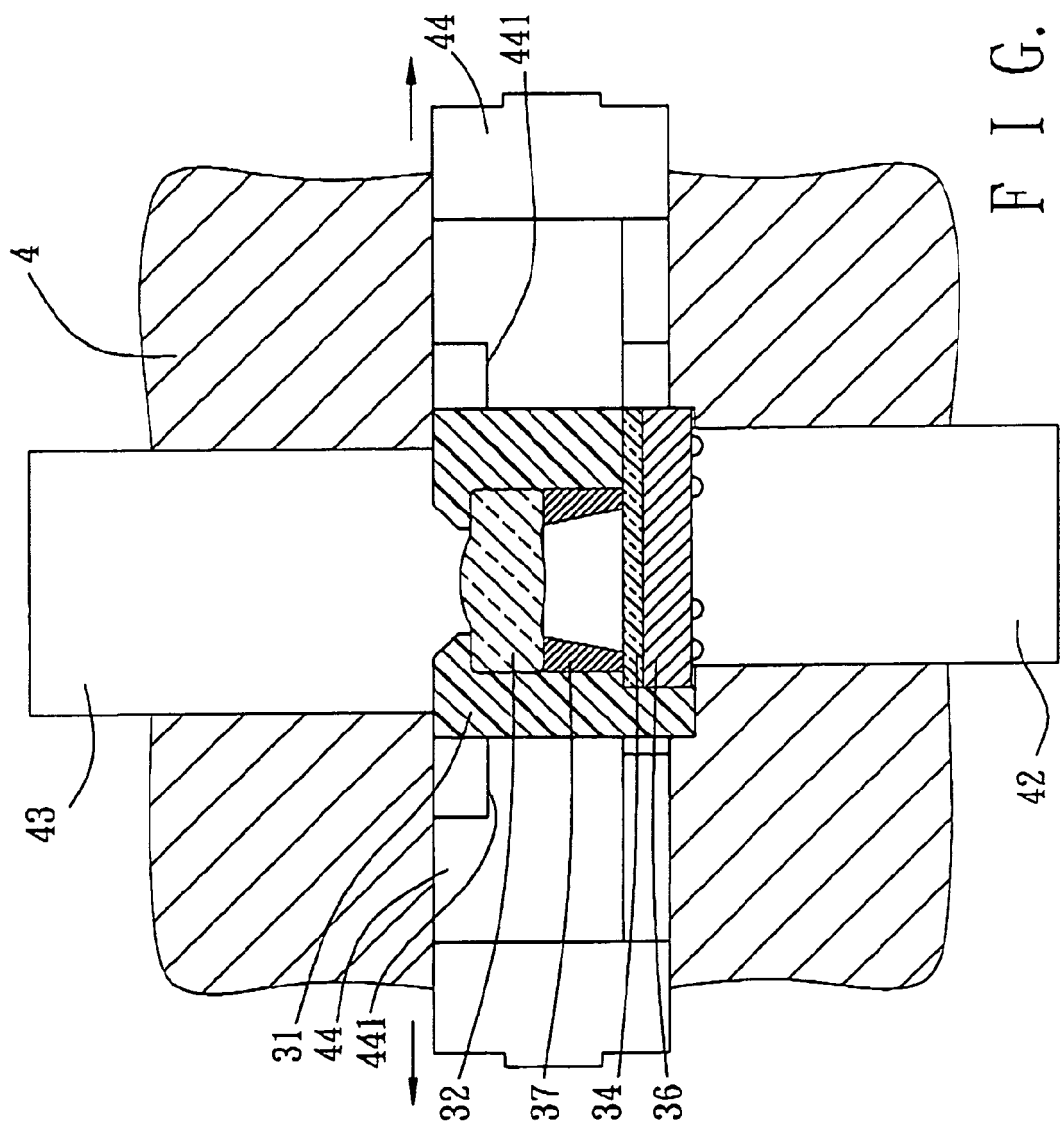

Referring to FIGS. 9 to 11, the second preferred embodiment of a camera module 310 according to this invention is shown to include a lens 32, a sensing element 36 spaced apart from the lens 32, a filter 34 mounted on the sensing element 36, a spacing ring 37 mounted between the filter 34 and the lens 32, and a barrel 31 molded over the sensing element 36, the filter 34, the spacing ring 37, and the lens 32 by insert molding. The spacing ring 37 has a tapered hole 371 converging along a direction from the sensing element 36 toward the lens 32.

The method for making the second preferred embodiment of the camera module 310 is substantially identical to the method for making the first preferred embodiment except that the sensing element 36, the filter 34, the spacing ring 37, and the lens 32 are positioned and centered sequentially or simultaneously within the mold cavity 41 of the mold 4 prior to the insert molding procedure.

Figure 12:
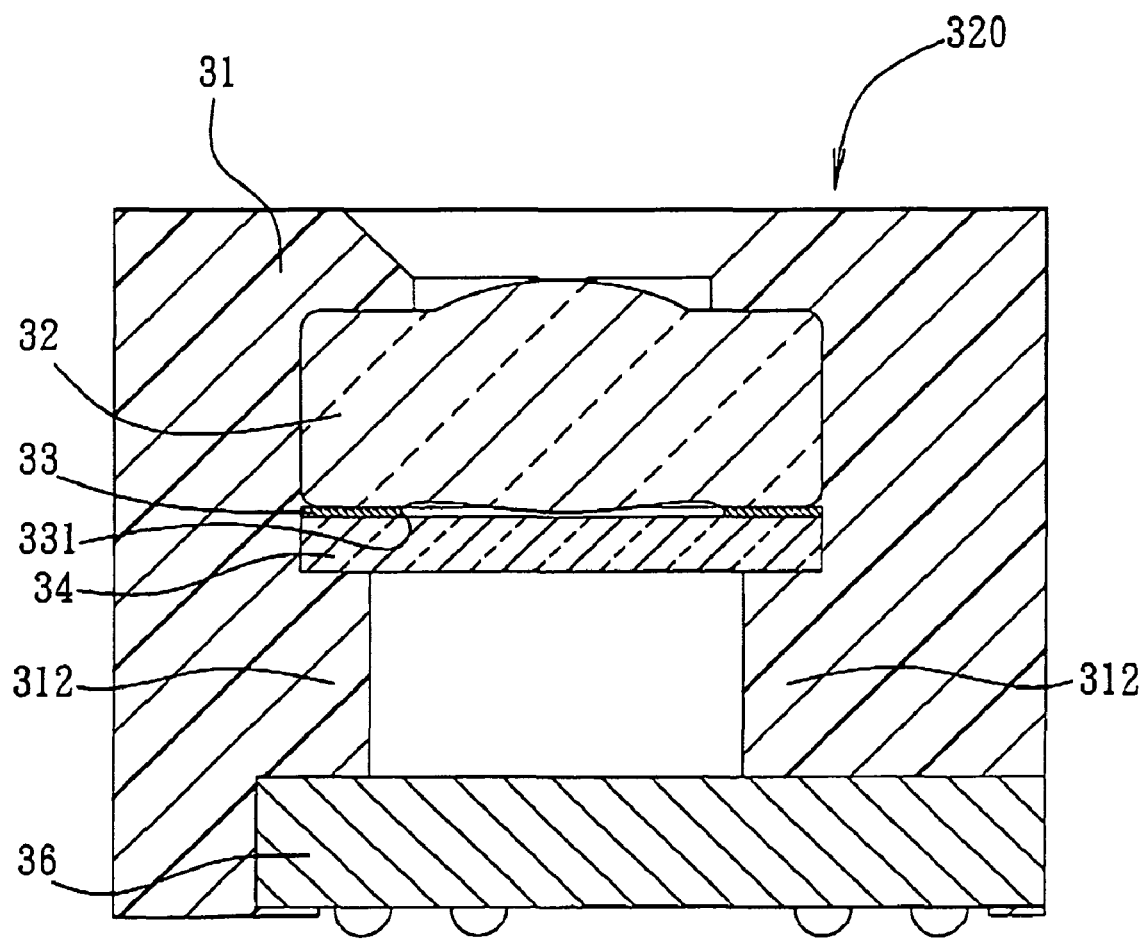
FIG. 12 is a sectional view of a third preferred embodiment of a camera module according to this invention.
Figure 13:
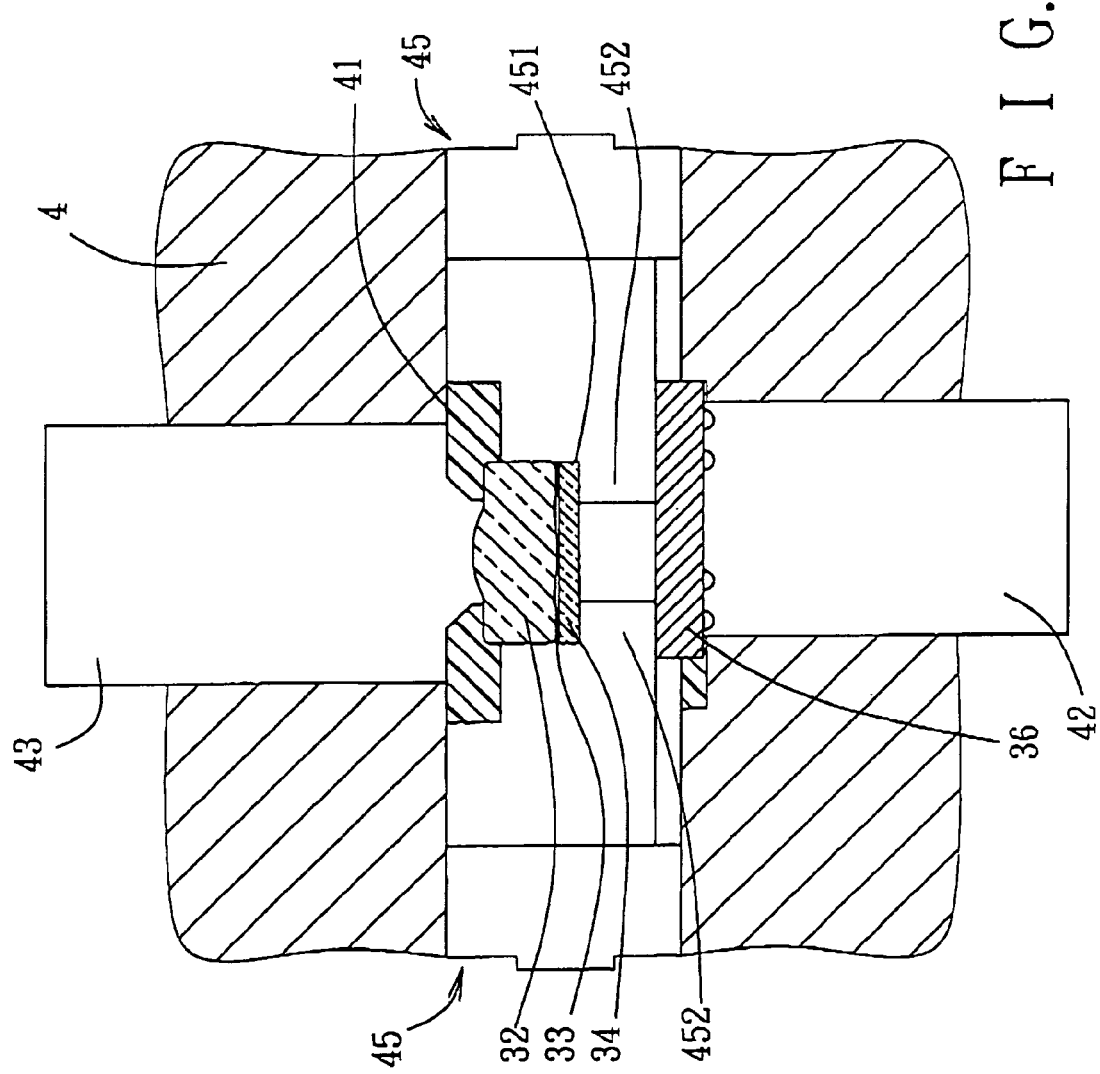
FIGS. 13 and 14 are sectional views illustrating steps of a method for making the third preferred embodiment.
Figure 14:
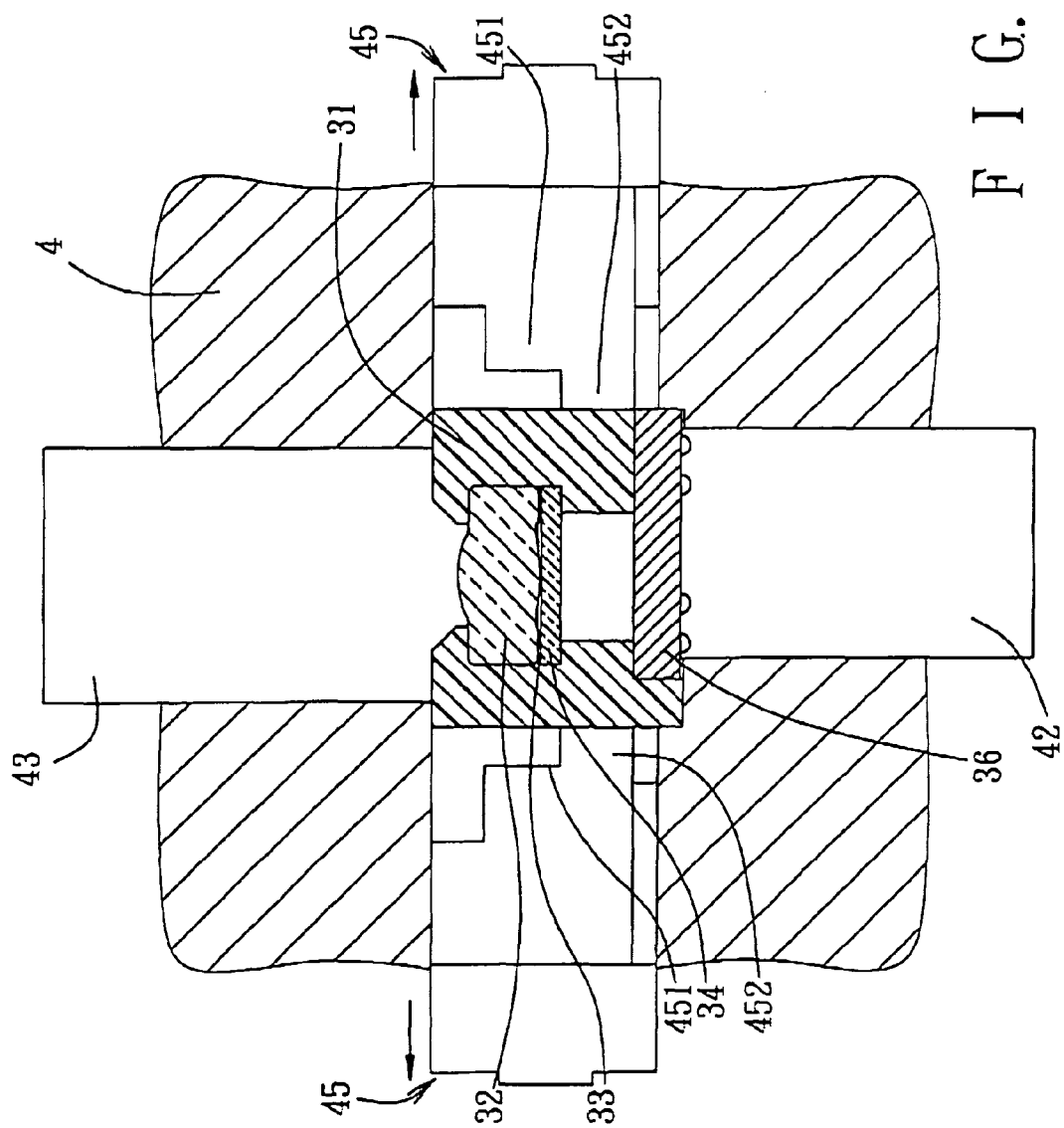

Referring to FIGS. 12 to 14, the third preferred embodiment of a camera module 320 according to this invention is shown to include a lens 32, a sensing element 36 spaced apart from the lens 32, a filter 34 mounted between the sensing element 36 and the lens 32 and proximate to the lens 32, a masking sheet 33 mounted between the lens 32 and the filter 34 and having a central hole 331, and a camera barrel 31 molded over the sensing element 36, the filter 34, the masking sheet 33, and the lens 32 by insert molding.

The method for making the third preferred embodiment of the camera module 320 is substantially identical to the method for making the first preferred embodiment except that the side positioners 45 abut against the sensing element 36, the filter 34, the masking sheet 33, and the lens 32 in the step (b) and that each of the side positioners 45 has an inner abutment surface 451 formed with a spacer portion 452 protruding between and separating the sensing element 36 and the filter 34 in the step (b).

Since the sensing element 36 and the filter 34 are separated by the spacer portion 452 of each of the side positioners 45, the filter 34 and the sensing element 36 of the camera module 320 are spaced apart from each other by a spacing portion 312 of the barrel 31 formed by insert molding. Therefore, the spacing portion 312 of the barrel 31 can function as a spacing ring.

Figure 15:
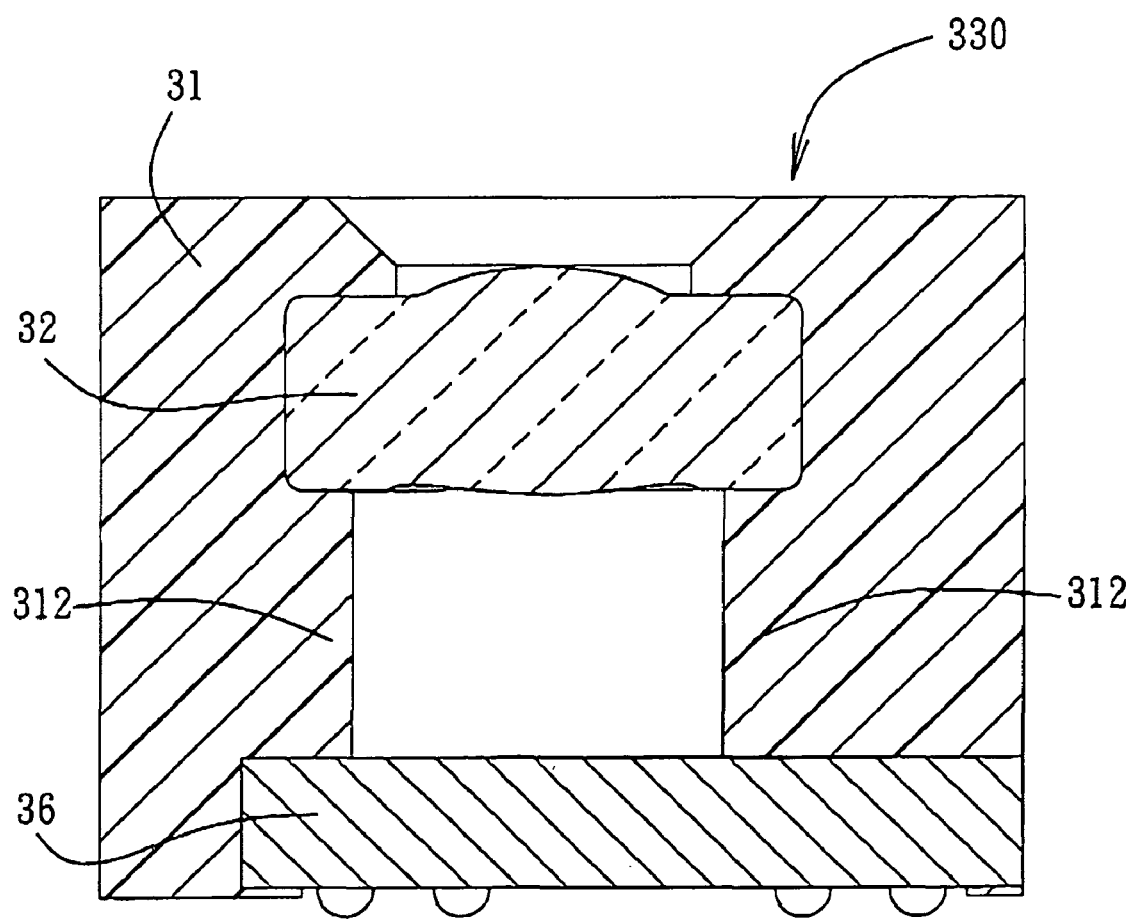
FIG. 15 is a sectional view of a fourth preferred embodiment of a camera module according to this invention.
Figure 16:
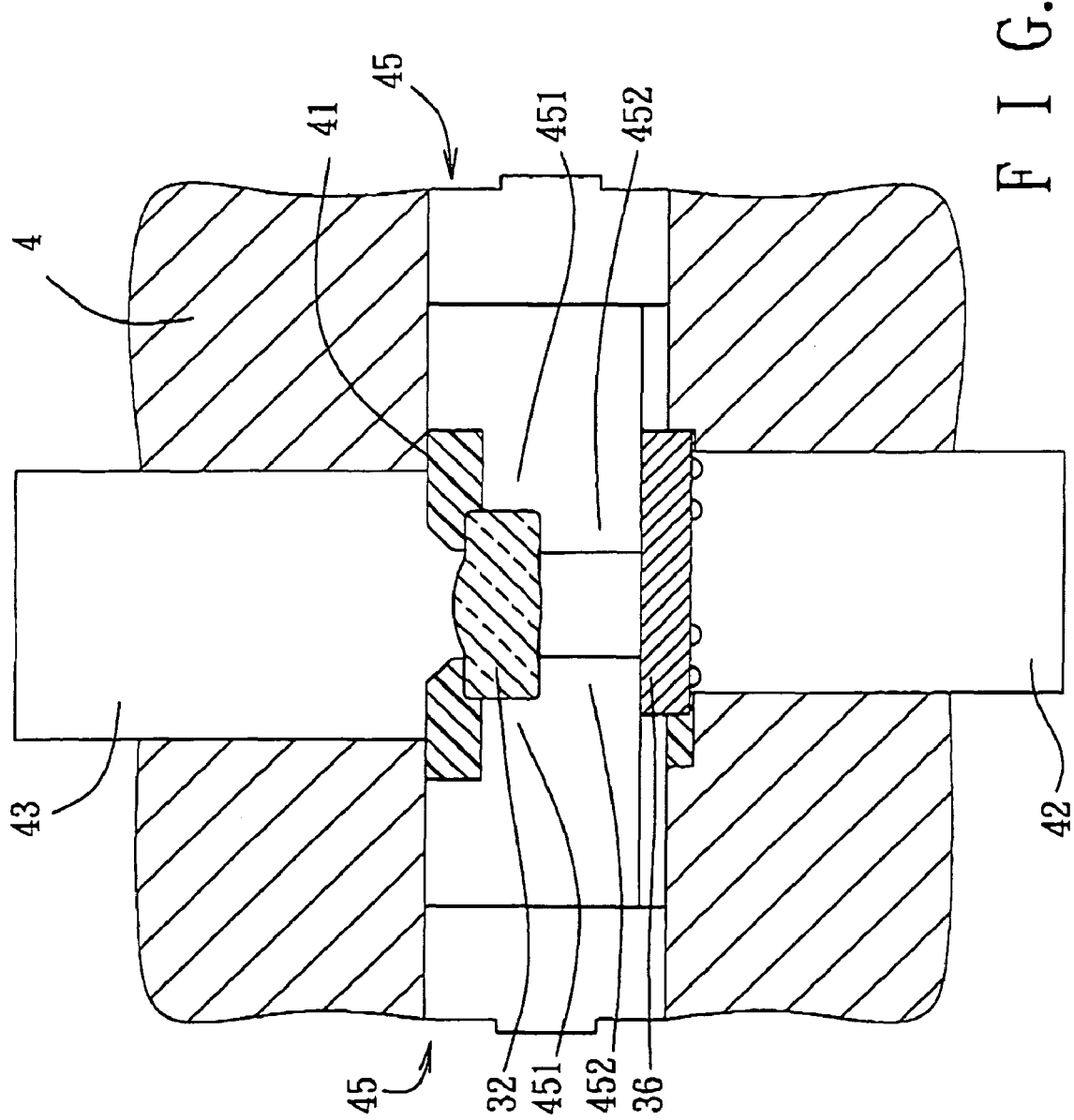
FIGS. 16 and 17 are sectional views illustrating steps of a method for making the fourth preferred embodiment.
Figure 17:
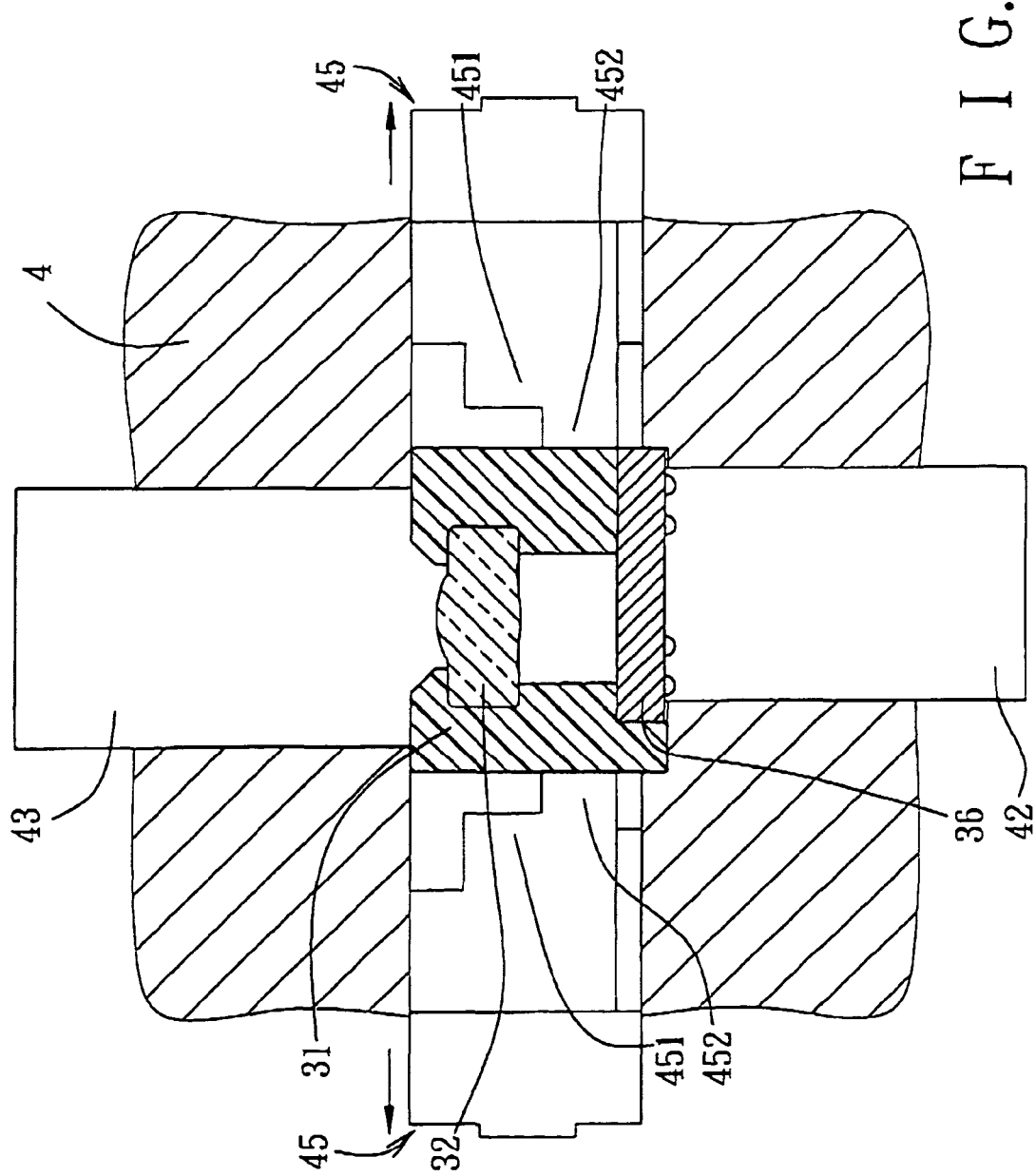

Referring to FIGS. 15 to 17, the fourth preferred embodiment of a camera module 330 according to this invention is shown to include a lens 32, a sensing element 36 spaced apart from the lens 32, and and a barrel 31 molded over the sensing element 36 and the lens 32 by insert molding.

The method for making the fourth preferred embodiment of the camera module 330 is substantially identical to the method for making the first preferred embodiment except that the side positioners 45 abut against the sensing element 36 and the lens 32 in the step (b) and that each of the side positioners 45 has an inner abutment surface 451 formed with a spacer portion 452 protruding between and separating the sensing element 36 and the lens 32 in the step (b).

Since the sensing element 36 and the lens 32 are separated by the spacer portion 452 of each of the side positioners 45, the lens 32 and the sensing element 36 of the camera module 330 are spaced apart from each other by a spacing portion 312 of the barrel 31 formed by insert molding. Therefore, the spacing portion 312 of the barrel 31 can function as a spacing ring. Additionally, the lens 32 can be coated with a masking layer and/or a filtering coat to obtain a masking and/or filtering effect.

Figure 18:
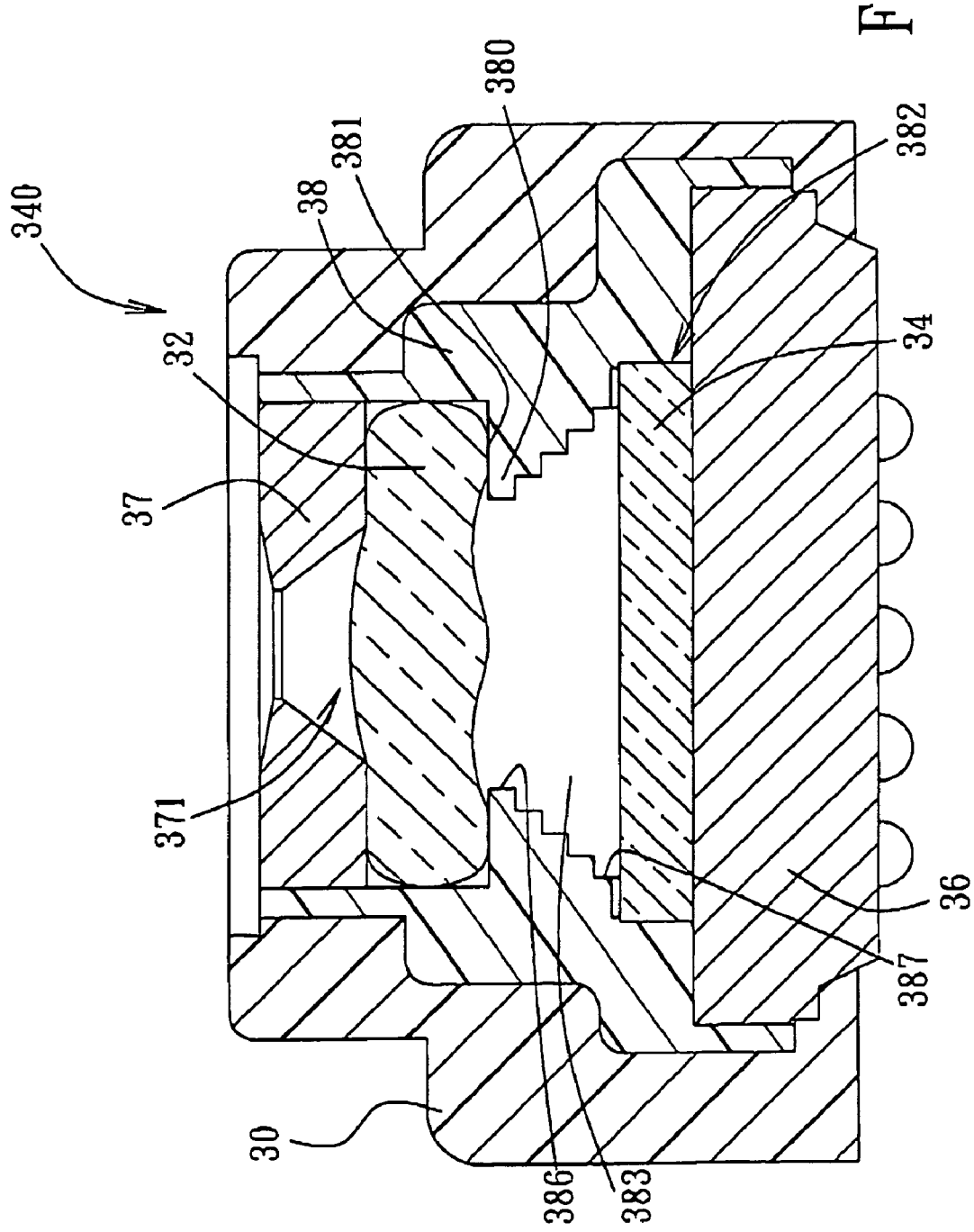
FIG. 18 is a sectional view of a fifth preferred embodiment of a camera module according to this invention.

Referring to FIG. 18, the fifth preferred embodiment of a camera module 340 according to this invention is shown to include: a lens 32; a sensing element 36 spaced apart from the lens 32; a filter 34 disposed over the sensing element 36; a spacing ring 37 disposed over the lens 32; a supporting member 38 surrounding the lens 32, the sensing element 36, the filter 34, and the spacing ring 37; and a barrel 30 molded over the supporting member 38 by insert molding. The spacing ring 37 has a tapered hole 371 converging in a direction away from the lens 32. The supporting member 38 includes an upper receiving portion 381 receiving the lens 32 and the spacing ring 37, a lower receiving portion 382 communicated with the upper receiving portion 381 and receiving the sensing element 36 and the filter 34, and an inner wall formed with an inwardly projecting spacer portion 380 extending between and separating the lens 32 and the filter 34. The inwardly projecting spacer portion 380 is formed between the upper and lower receiving portions 381, 382. The inwardly projecting spacer portion 380 defines a middle communicating portion 383 converging in a direction from the lower receiving portion 382 toward the upper receiving portion 381, and extends between and separates the lens 32 and the sensing element 36. The inwardly projecting spacer portion 380 further has an upper hole 386 and a lower hole 387 having a size larger than that of the upper hole 386.

Figure 19:
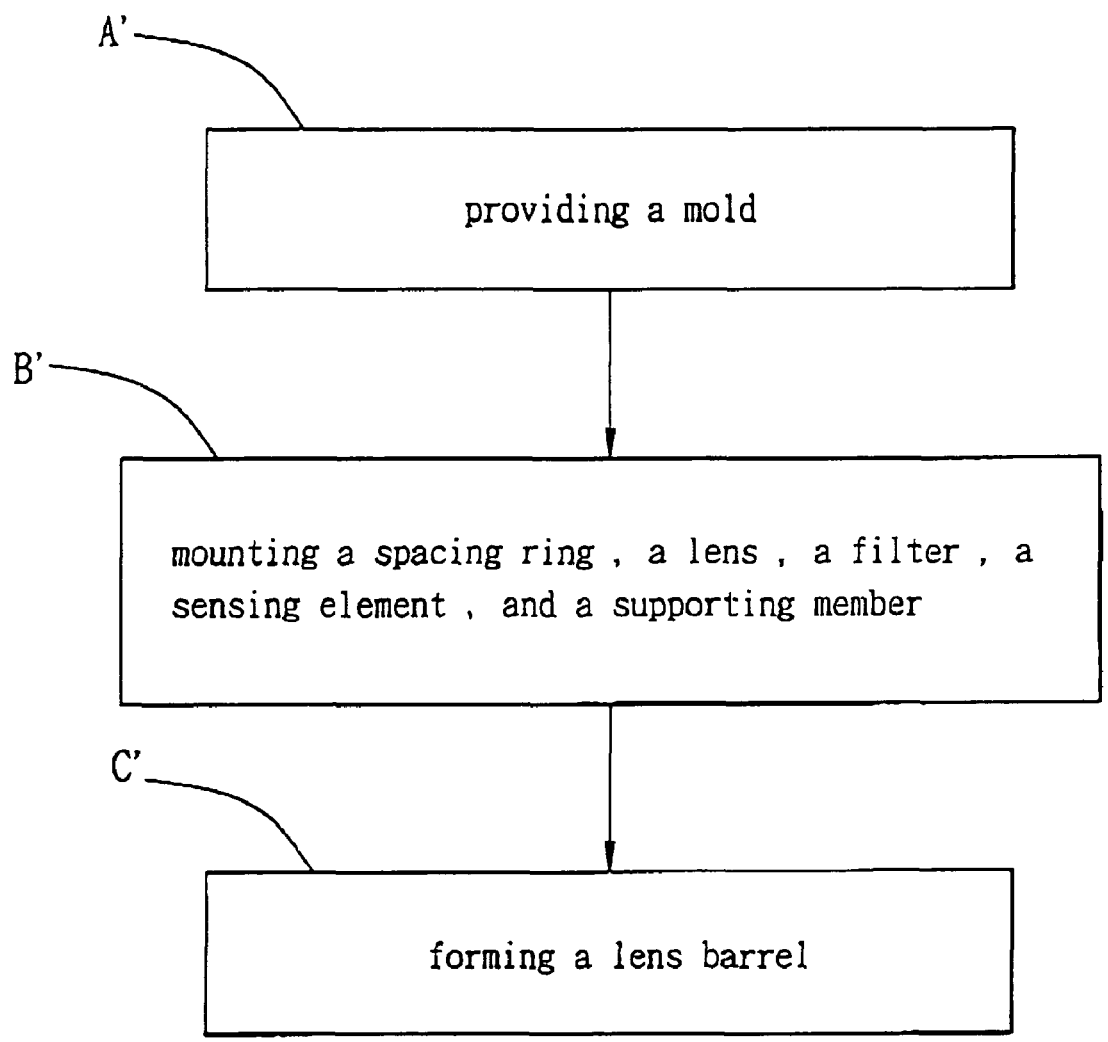
FIG. 19 is a flow chart of a method for making the fifth preferred embodiment.
Figure 20:
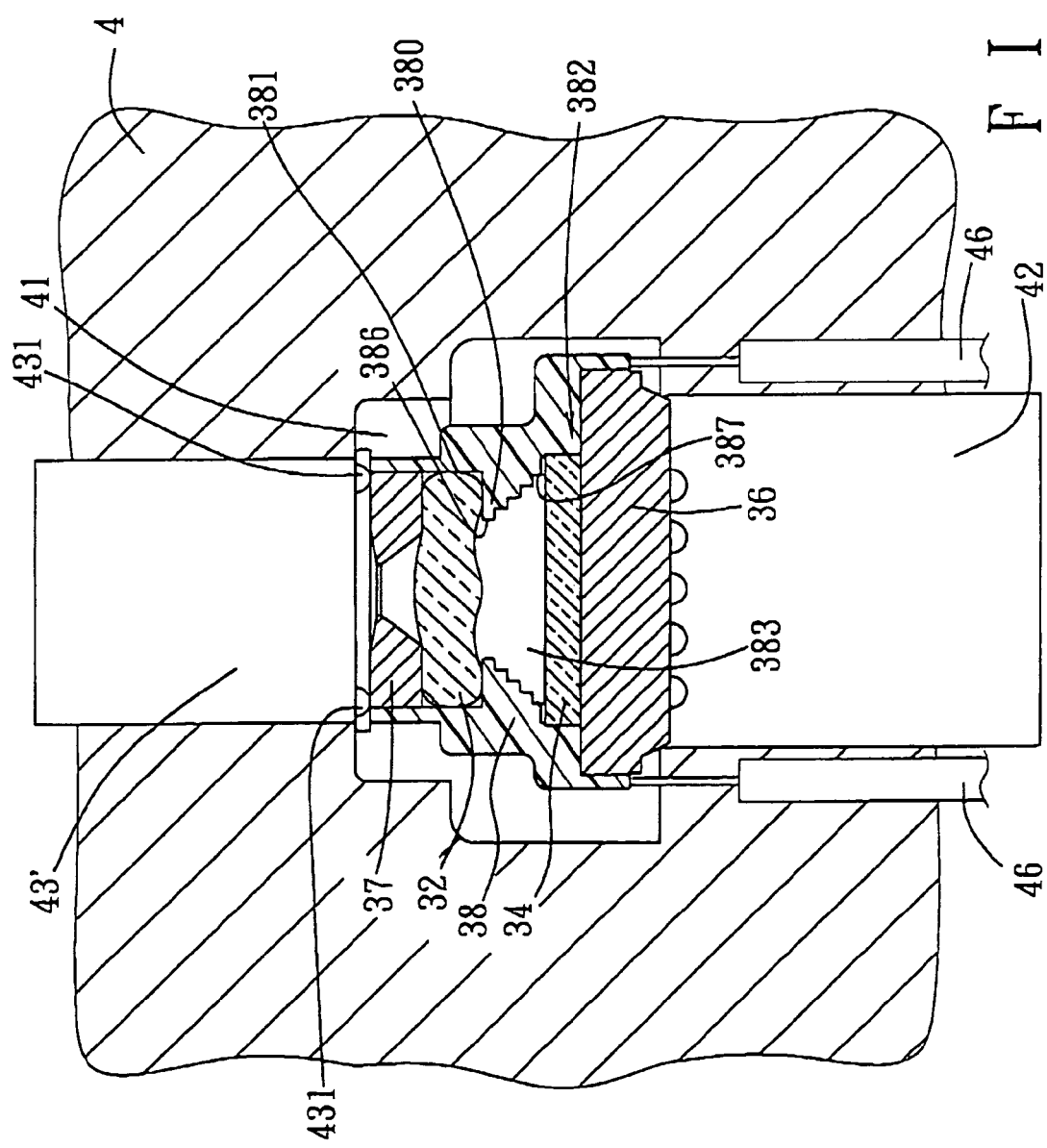
FIGS. 20 and 21 are sectional views illustrating steps of a method for making the fifth preferred embodiment.
Figure 21:
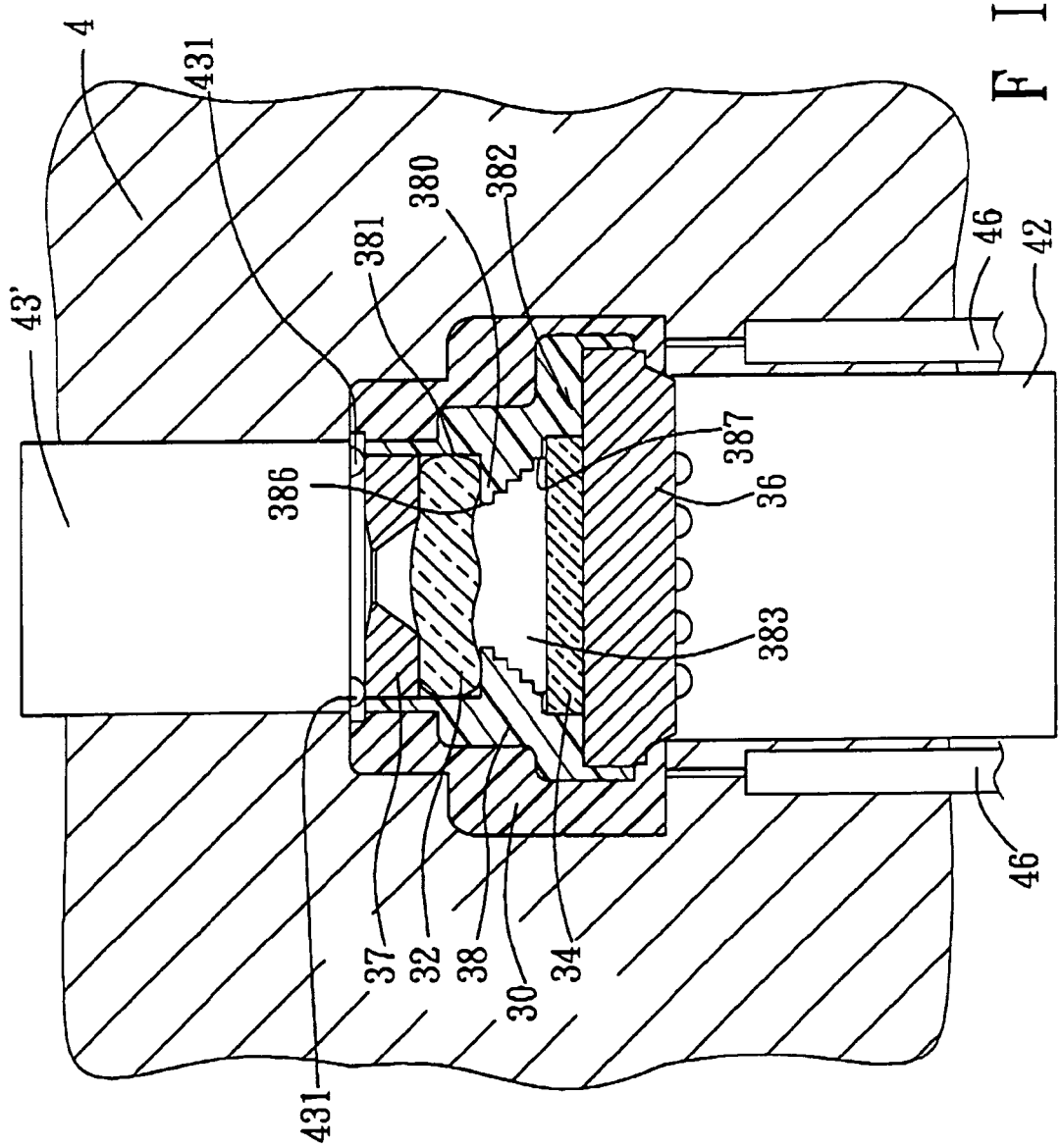

Referring to FIGS. 19 to 21, a method for making the fifth preferred embodiment of the camera module 340 includes the steps of:

(A') Providing a Mold 4:

The mold 4 has a mold cavity 41, and includes upper and lower positioners 43', 42, and two positioning posts 46 at two opposite sides of the lower positioner 42. The upper positioner 43' has two protruding portions 431 at a bottom surface thereof.

(B') mounting the spacing ring 37, the lens 32, the filter 34, the sensing element 36, and the supporting member 38:

The spacing ring 37 and the lens 32 are mounted in the upper receiving portion 381 of the supporting member 38 in a manner that the spacing ring 37 and the lens 32 abut against each other. The filter 34 and the sensing element 36 are mounted in the lower receiving portion 382 of the supporting member 38. The supporting member 38 in which the spacing ring 37, the lens 32, the filter 34, and the sensing element 36 are mounted is mounted in the mold cavity 41. The upper and lower positioners 43', 42 abut against the spacing ring 37 and the sensing element 36, respectively. The positioning posts 46 abut against two opposite sides of the supporting member 38.

(C') forming the barrel 30:

A molding material is injected into the mold cavity 41 and is molded over the sensing element 36 and the supporting member 38 by insert molding. The barrel 30 is formed over the sensing element 36 and the supporting member 38 when the molding material is hardened.

Figure 22:
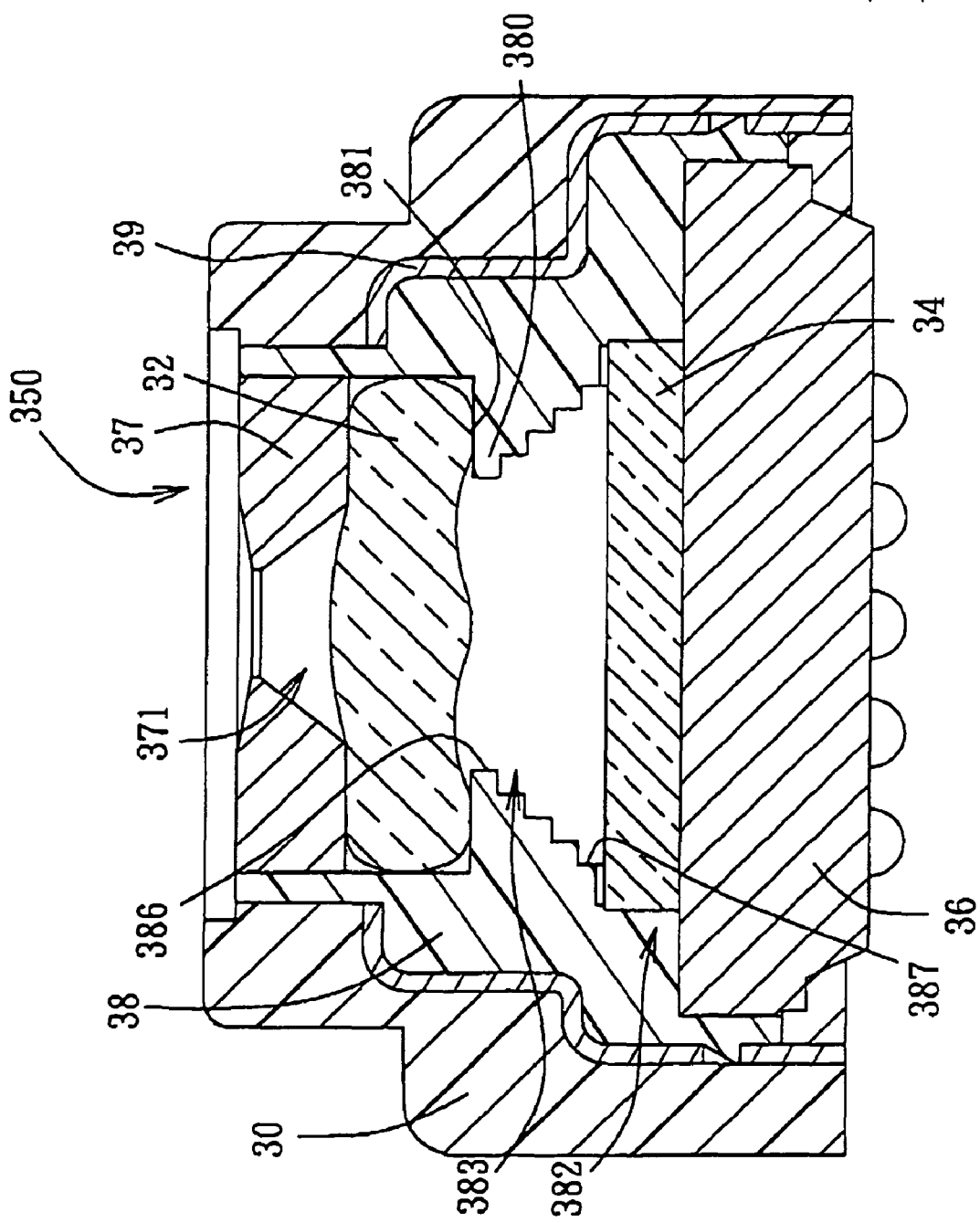
FIG. 22 is a sectional view of a sixth preferred embodiment of a camera module according to this invention.

Referring to FIG. 22, the sixth preferred embodiment of a camera module 350 according to this invention is shown to be similar to the fifth preferred embodiment except that the camera module 350 further includes a shielding element 39 sleeved around the supporting member 38 to shield the camera module 350 from electromagnetic interference.

Figure 23:
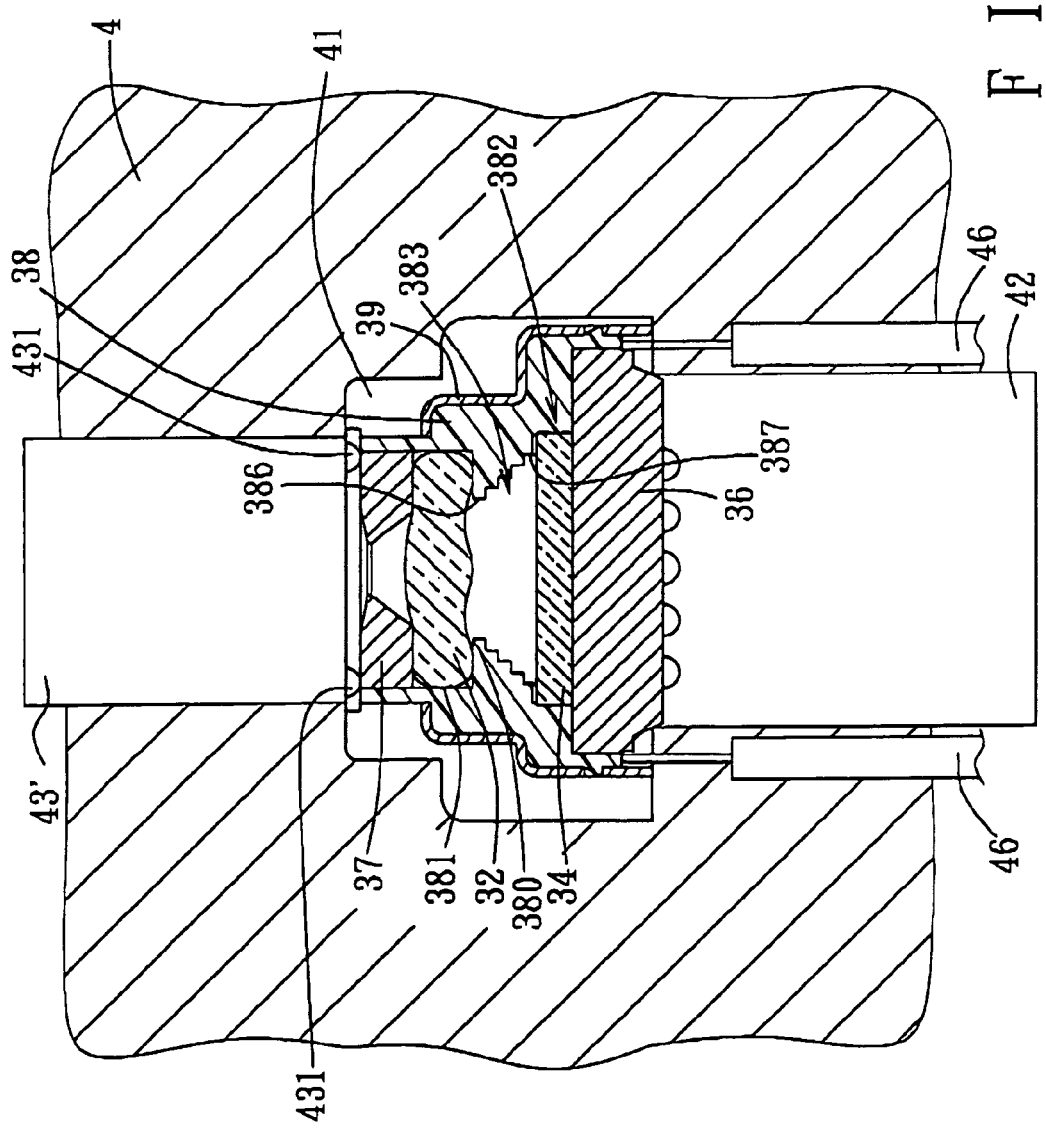
FIGS. 23 and 24 are sectional views illustrating steps of a method for making the sixth preferred embodiment.
Figure 24:
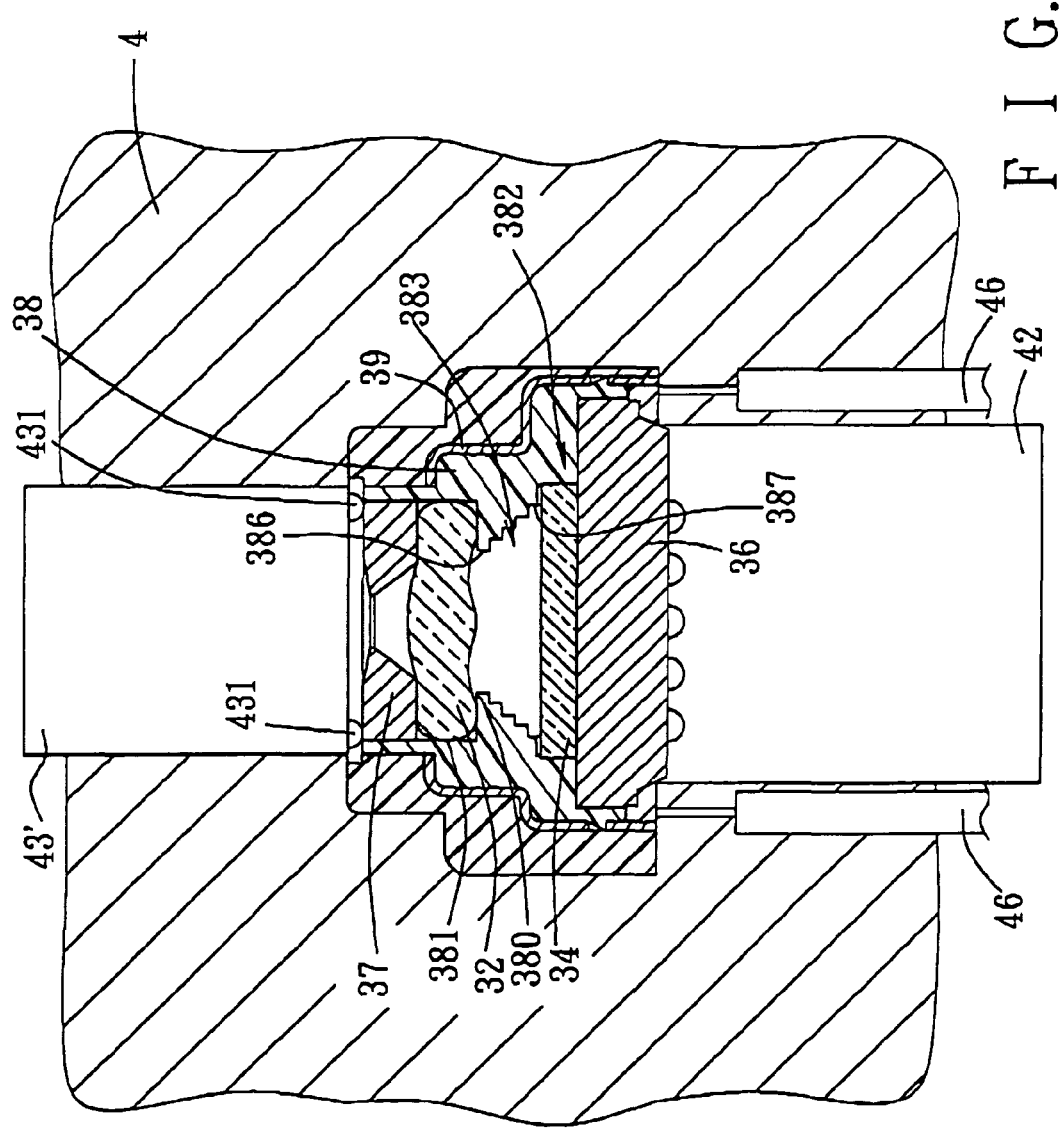

Referring to FIGS. 23 and 24, a method for making the sixth preferred embodiment of the camera module 350 is similar to the method for making the fifth preferred embodiment except that the shielding element 39 is sleeved around the supporting member 38 before the supporting member 38 is mounted in the mold cavity 41.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for making a camera module, comprising the steps of:
   (a) providing a mold with a mold cavity;
   (b) mounting at least a sensing element and a lens within the mold cavity in such a manner that the sensing element and the lens are spaced apart in an axial direction from each other; and
   (c) forming a barrel by injecting a molding material into the mold cavity and by molding the molding material over the sensing element and the lens, wherein the molding material flows onto a peripheral portion of an outer surface of the sensing element which is axially opposite to the lens so that the outer surface of the sensing element is partially enclosed by the barrel, and
   wherein the mounting of the sensing element and the lens comprises positioning and centering the sensing element and the lens within the mold cavity by moving upper and lower positioners within the mold to abut against the lens and the sensing element, respectively, and by moving two opposite side positioners within the mold to abut against the lens and the sensing element, wherein the side positioners are moved in directions which are transverse to moving directions of the upper and lower positioners.

2. The method as claimed in claim 1, further comprising gradually moving the side positioners away from the lens and the sensing element during the injecting of the molding material so as to permit the molding material to flow between the lens and the side positioners and between the sensing element and the side positioners.

3. The method as claimed in claim 2, wherein the molding material flows between the lens and the side positioners at the beginning of the injecting of the molding material and before flowing between the sensing element and the side positioners, and wherein each of the side positioners has an inner abutment surface with an indentation adjacent to the lens.

4. The method as claimed in claim 1, wherein a filter is mounted between the sensing element and the lens and adjacent to the lens, and the side positioners abut against the sensing element, the lens, and the filter in the step (b).

5. The method as claimed in claim 1, wherein each of the side positioners has an inner abutment surface formed with a spacer portion protruding between and separating the sensing element and the lens.

6. The method as claimed in claim 4, wherein each of the side positioners has an inner abutment surface formed with a spacer portion protruding between and separating the sensing element and the filter.

7. A method for making a camera module, comprising the steps of:
(a) providing a mold with a mold cavity;
(b) mounting at least a sensing element and a lens within the mold cavity in such a manner that the sensing element and the lens are spaced apart in an axial direction from each other; and
(c) forming a barrel by injecting a molding material into the mold cavity and by molding the molding material over the sensing element and the lens, wherein the molding material flows onto a peripheral portion of an outer surface of the sensing element which is axially opposite to the lens so that the outer surface of the sensing element is partially enclosed by the barrel,
wherein a supporting member is mounted within the molding cavity, and the lens and the sensing element are spaced apart and surrounded by the supporting member, and
wherein a filter is disposed over the sensing element, a spacing ring is disposed over the lens, the supporting member has an inner wall formed with an inwardly projecting spacer portion extending between and separating the lens and the filter, and the mold has upper and lower positioners to abut against the spacing ring and the sensing element, and two positioning posts at two opposite sides of the lower positioner to abut against the supporting member.

8. A method for making a camera module, comprising the steps of:
(a) providing a mold with a mold cavity;
(b) mounting at least a sensing element and a lens within the mold cavity in such a manner that the sensing element and the lens are spaced apart from each other; and
(c) forming a barrel by injecting a molding material into the mold cavity and by molding the molding material over the sensing element and the lens, wherein the mounting of the sensing element and the lens comprises positioning and centering the sensing element and the lens within the mold cavity by moving upper and lower positioners within the mold to abut against the lens and the sensing element, respectively, and by moving two opposite side positioners within the mold to abut against the lens and the sensing element, wherein the side positioners are moved in directions which are transverse to moving directions of the upper and lower positioners.

9. The method as claimed in claim 8, further comprising gradually moving the side positioners away from the lens and the sensing element during the injecting of the molding material so as to permit the molding material to flow between the lens and the side positioners and between the sensing element and the side positioners.

10. The method as claimed in claim 9, wherein the molding material flows between the lens and the side positioners at the beginning of the injecting of the molding material and before flowing between the sensing element and the side positioners, and wherein each of the side positioners has an inner abutment surface with an indentation adjacent to the lens.

11. The method as claimed in claim 8, wherein a filter is mounted between the sensing element and the lens and adjacent to the lens, and the side positioners abut against the sensing element, the lens, and the filter in the step (b).

12. The method as claimed in claim 8, wherein each of the side positioners has an inner abutment surface formed with a spacer portion protruding between and separating the sensing element and the lens.

13. The method as claimed in claim 11, wherein each of the side positioners has an inner abutment surface formed with a spacer portion protruding between and separating the sensing element and the filter.

14. The method as claimed in claim 8, wherein a supporting member is mounted within the molding cavity, and the lens and the sensing element are spaced apart and surrounded by the supporting member.

15. The method as claimed in claim 14, wherein a filter is disposed over the sensing element, a spacing ring is disposed over the lens, the supporting member has an inner wall formed with an inwardly projecting spacer portion extending between and separating the lens and the filter, and the mold has upper and lower positioners to abut against the spacing ring and the sensing element, and two positioning posts at two opposite sides of the lower positioner to abut against the supporting member.

* * * * *